Figure 1:
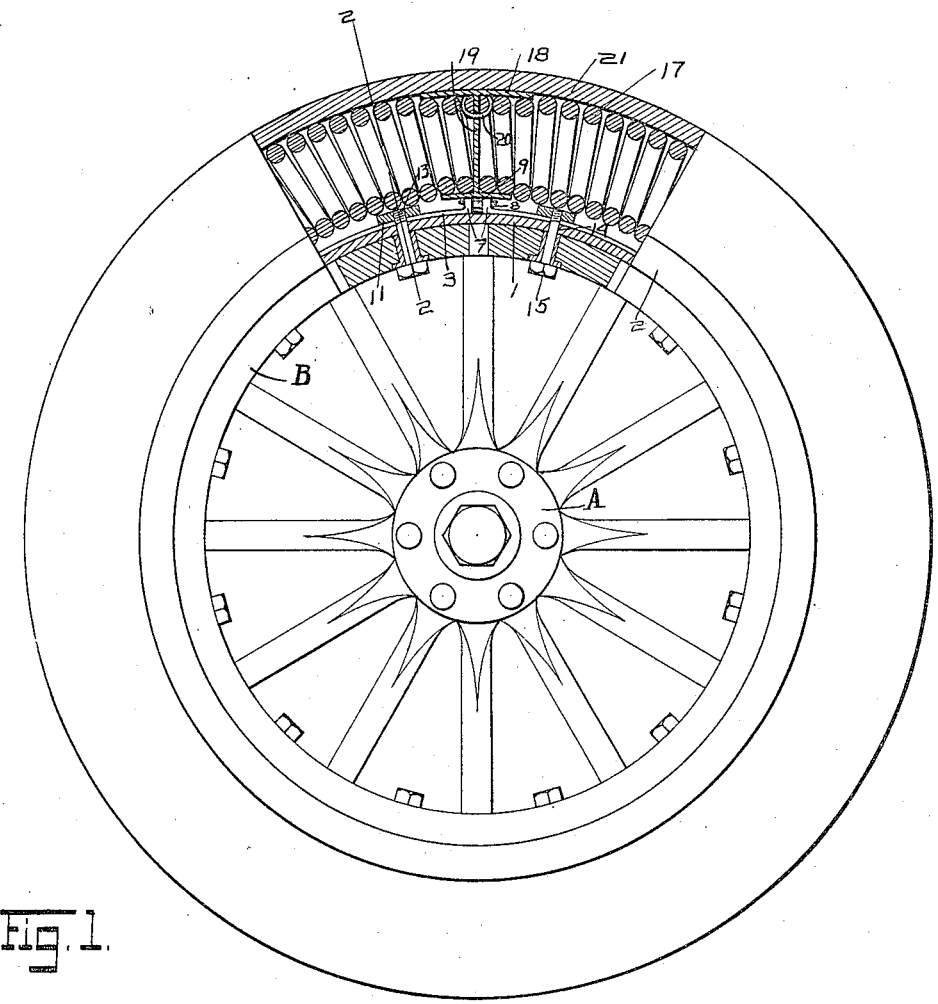

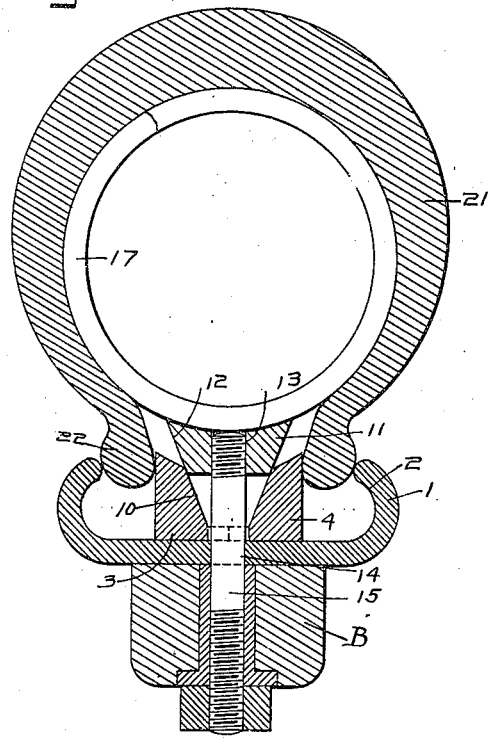
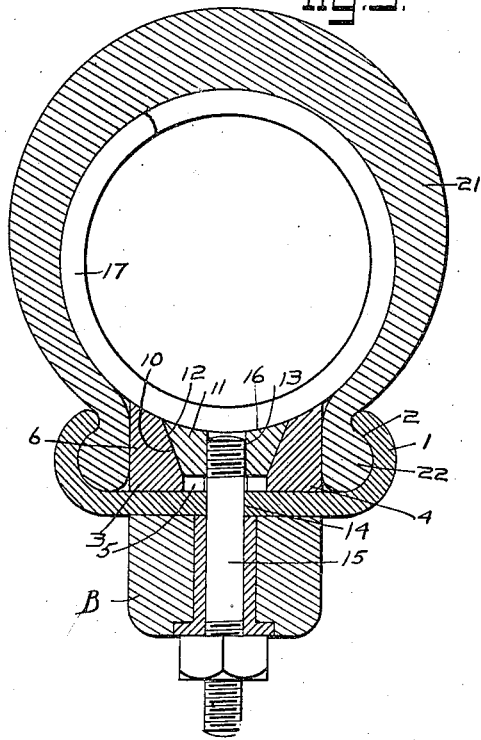
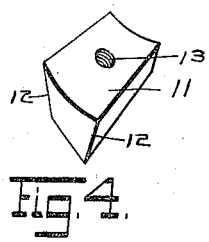
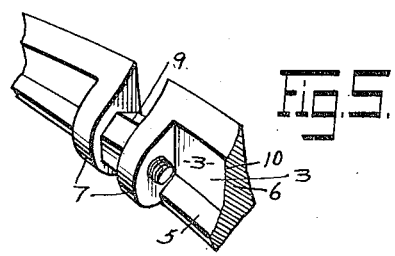

UNITED STATES PATENT OFFICE.

JAMES BAIRD, OF DETROIT, MICHIGAN.

SPRING-WHEEL.

1,045,661.

Specification of Letters Patent.     Patented Nov. 26, 1912.

Application filed August 17, 1911. Serial No. 644,553.

*To all whom it may concern:*

Be it known that I, JAMES BAIRD, a citizen of the United States, residing at Detroit, in the county of Wayne, State of Michigan, have invented certain new and useful Improvements in Spring-Wheels; and I do hereby declare the following to be a full, clear, and exact description of the invention, such as will enable others skilled in the art to which it appertains to make and use the same.

My invention relates to new and useful improvements in tire constructions, and more especially to spring tires and the object of my invention is to provide a simple and effective form of spring tire which may be used upon all kinds of vehicles, but which is especially adapted for use upon self-propelled vehicles.

A further object of my invention is to provide a tire of the above described type in which the necessary resiliency is obtained by the use of a coiled spring extending completely around the wheel and having its adjacent ends secured together in such a manner as to protect the shoe from the excessive wear usually met with in tires of this type. And a still further object of my invention is to provide a novel form of locking means for clamping the shoe in position upon the rim and around said coiled spring.

With these and other objects in view, my invention will be more fully described, illustrated in the drawings which show a preferred embodiment of my tire construction and then specifically pointed out in the claims which are attached to and form a part of this application.

In the accompanying drawings, Figure 1 is a side elevation of the wheel, partially in section, showing the coiled spring and the means for securing the ends thereof together. Fig. 2 is a vertical section on the line 2—2 of Fig. 1 showing the shoe in position but not as yet clamped to the rim of the wheel. Fig. 3 is a similar section showing the shoe clamped in place. Fig. 4 is a perspective of one of the clamping nuts used. Fig. 5 is a detail perspective of a portion of one of the clamping rings showing the means employed in securing their ends together.

Referring more specifically to the drawings, in which similar reference numerals designate corresponding parts throughout, A represents a conventional wheel having a felly B upon which is secured a rim 1 provided as shown, with upwardly extending, inwardly directed annular flanges 2. Surrounding the rim and seated therein between these flanges are two clamping rings 3 and 4 and as the construction of these rings is identical the description of one will serve for both. The ring 3 consists of a strip of spring metal, substantially L-shaped in section and bent in the form of a circle. In applying this ring to the rim of the wheel it is positioned around the same with the flange 5 of the ring resting upon the outer face of the rim and directed laterally inwardly, and with the flange 6 extending vertically upwardly from the rim. Adjacent each end of this ring member the flange 6 is provided with an inwardly directed lug 7 and each of these lugs is provided with a threaded bore 8, the threads in the two bores being oppositely directed to adapt them for engagement with a turn bolt 9, by means of which the ends of the ring are drawn together thus securing the ring in proper position upon the rim. The inner edges of each of the flanges 6 of the clamping rings are beveled as shown at 10 and seated between said edges are a plurality of spaced apart clamping nuts 11 having beveled faces 12 adapted to engage with the beveled edges of the clamping rings. These nuts are each provided with a threaded bore 13 which registers with a suitable bore 14 formed in the rim and felly and bolts 15 are passed outwardly through the bores 14 and engage with threads of the bores 13 whereby the nuts 11 may be drawn inwardly to spread the clamping rings apart for a purpose which is hereinafter explained. It will of course be understood that the flanges 5 are recessed at suitable intervals to provide bores for the passage of the bolts 15.

Surrounding the rim of the wheel and seated upon the outer edges of the flanges 6 of the clamping rings, which edges are curved as at 16 to form a suitable seat, is a coiled spring tire 17. This tire is formed from a single piece of resilient metal and its abutting ends are secured together, as best shown in Fig. 1 of the drawings, by means of a coupler 18. This coupler as shown consists of a metallic tubular member curved longitudinally to conform to the curvature of the wheel, and provided intermediate its length with a web 19, the outer diameter of the coupler member being equal in diameter to that of the convolutions of the tire spring. As shown, several of the convolutions adjacent each end of the tire spring are somewhat reduced in diameter by means of which said convolutions may be inserted into the ends of the coupler 18 and secured to the flange 19 thereof by hooks or other suitable fastening means 20. The hooks 20 are preferably formed from a single piece of wire which is passed through a suitable aperture formed in the flange 19 and the ends of which are bent around the terminal convolutions of the wire 17 as best shown in Fig. 1 of the drawings. Surrounding this coiled tire spring is a cover or shoe 21 which may be formed of rubber, leather or other preferred flexible material, and as shown the edge portions of this shoe are provided with outwardly directed beads 22 adapted to be seated between the rim 1 and the peripheral flanges 2 thereof. When in this position, which is the position shown in Fig. 2 of the drawings, the shoe is clamped in place by the tightening of the bolts 15 which draw the nuts inwardly to force the clamping rings apart, as previously described, thus causing a close engagement of the beads 22 of the shoe by the flanges 2 of the rim and the flanges 6 of the clamping ring.

As will be readily understood from the foregoing description I have provided an extremely simple and efficient form of spring tire, and one which because of the novel means employed in securing the shoe in position, may be readily and quickly repaired. The coupling member used in securing the ends of the coiled spring together is extremely important in that it not only fastens the ends together but also prevents undue wear of the cover at the joint.

What I claim is:—

1. A vehicle tire of continuous elastic coiled wire, and means for securing the ends of said tire together, said means consisting of an arcuate shaped tubular coupler member provided with a centrally positioned web, and means for securing the terminal convolutions of the tire to said web.

2. The combination with a continuous resilient coiled wire tire having its terminal convolutions somewhat reduced in diameter, of a coupler for securing the ends of said tire together, said coupler comprising an arcuate shaped tubular member adapted to receive the reduced terminals of the tire, said member being provided with a central web against which the terminal convolutions bear, and a wire passed through an aperture formed in said flange and bent to engage with said convolutions.

In testimony whereof, I affix my signature, in presence of two witnesses.

JAMES BAIRD.

Witnesses:
WILLIAM J. CURRY,
ALISON M. BAIRD.

---

Copies of this patent may be obtained for five cents each, by addressing the "Commissioner of Patents, Washington, D. C."